United States Patent
Silva

(10) Patent No.: US 11,234,503 B2
(45) Date of Patent: Feb. 1, 2022

(54) CONTAINER FOR COSMETIC SPONGE APPLICATOR

(71) Applicant: REA.DEEMING BEAUTY, INC., Bethlehem, PA (US)

(72) Inventor: Rea Ann Silva, Bethlehem, PA (US)

(73) Assignee: REA.DEEMING BEAUTY, INC., Bethlehem, PA (US)

( * ) Notice: Subject to any disclaimer, the term of this patent is extended or adjusted under 35 U.S.C. 154(b) by 7 days.

(21) Appl. No.: 16/785,481

(22) Filed: Feb. 7, 2020

(65) Prior Publication Data

US 2020/0253355 A1 Aug. 13, 2020

Related U.S. Application Data

(60) Provisional application No. 62/803,397, filed on Feb. 8, 2019.

(51) Int. Cl.
| | |
|---|---|
| *A46B 11/00* | (2006.01) |
| *A45D 34/04* | (2006.01) |
| *A45D 40/24* | (2006.01) |
| *A45D 40/00* | (2006.01) |
| *A61C 19/02* | (2006.01) |
| *A45D 40/18* | (2006.01) |
| *A45C 11/00* | (2006.01) |
| *A45C 5/00* | (2006.01) |
| *A45D 33/26* | (2006.01) |

(52) U.S. Cl.
CPC ............ *A45D 34/041* (2013.01); *A45C 5/005* (2013.01); *A45C 11/008* (2013.01); *A45D 33/26* (2013.01); *A45D 40/0068* (2013.01); *A45D 40/18* (2013.01); *A45D 40/24* (2013.01); *A61C 19/02* (2013.01); *A45D 2200/053* (2013.01); *A45D 2200/1009* (2013.01)

(58) Field of Classification Search
CPC ...... A45D 34/04; A45D 34/041; A45D 33/26; A45D 40/0068; A45D 2200/05; A45D 2200/053; A45D 40/24; A45D 40/18; A45C 5/005; A45C 11/008; A61C 19/02
USPC ........................................................ 401/123
See application file for complete search history.

(56) References Cited

U.S. PATENT DOCUMENTS

| | | |
|---|---|---|
| 558,535 A | 4/1896 | vivian |
| 1,247,906 A | 11/1917 | Tully |
| 1,380,208 A | 5/1921 | Holtschneider |
| 1,589,215 A | 6/1926 | Forest |

(Continued)

FOREIGN PATENT DOCUMENTS

| | | |
|---|---|---|
| CH | 684574 | 10/1994 |
| CN | 201001673 | 1/2008 |

(Continued)

OTHER PUBLICATIONS

Beautylish, How should I store my beautyblender?, Sep. 8, 2014, https://www.beautylish.com/t/yuamrw/how-should-i-store-my-beautyblender.

*Primary Examiner* — Jennifer C Chiang
(74) *Attorney, Agent, or Firm* — Concept IP LLP; Pejman Yedidsion

(57) ABSTRACT

Systems, devices, and methods including a container including: a base portion configured to receive a dampened cosmetic sponge; a cap portion configured to be detachably attached to the base portion; and one or more apertures disposed in the cap portion, where the one or more apertures provide airflow into the container.

17 Claims, 11 Drawing Sheets

(56) References Cited

U.S. PATENT DOCUMENTS

| | | |
|---|---|---|
| 1,732,028 A | 10/1929 | Reiner |
| 2,247,600 A | 7/1941 | Brennan et al. |
| 2,255,503 A | 9/1941 | Carbary |
| 2,438,129 A | 3/1948 | Richard |
| 2,555,047 A | 5/1951 | Floyd |
| 2,620,085 A | 12/1952 | Baldanza |
| 2,657,090 A | 10/1953 | Meek |
| 2,708,595 A | 5/1955 | Carl |
| 2,738,225 A | 3/1956 | Meek |
| 2,765,194 A | 10/1956 | Theodore |
| 2,769,565 A | 11/1956 | John |
| 2,783,084 A | 2/1957 | Worthen |
| 2,836,462 A | 5/1958 | Wenner |
| 2,878,060 A | 3/1959 | Dello |
| 2,958,469 A | 11/1960 | Shuster |
| 3,686,788 A | 8/1972 | Braunhut |
| 3,754,707 A | 8/1973 | Morane |
| 3,848,803 A | 11/1974 | Levey |
| 4,033,650 A | 7/1977 | Alissandratos |
| 4,084,732 A | 4/1978 | Dearling |
| 4,258,874 A | 3/1981 | Webinger et al. |
| 4,293,095 A | 10/1981 | Hamilton et al. |
| 4,306,679 A | 12/1981 | Dusek et al. |
| 4,323,193 A | 4/1982 | Compton et al. |
| 4,345,512 A | 8/1982 | Moore |
| 4,502,630 A | 3/1985 | Haworth et al. |
| 4,532,719 A | 8/1985 | Davies et al. |
| 4,532,722 A | 8/1985 | Sax |
| D280,757 S | 9/1985 | Paulovich et al. |
| 4,545,917 A | 10/1985 | Smith et al. |
| 4,549,693 A | 10/1985 | Barlics |
| 4,567,675 A | 2/1986 | Rennie |
| 4,696,317 A | 9/1987 | Shioi et al. |
| 4,739,928 A | 4/1988 | O'Neil |
| D317,044 S | 5/1991 | Thomson |
| 5,033,674 A | 7/1991 | Smith |
| 5,163,616 A | 11/1992 | Bernarducci et al. |
| 5,314,669 A | 5/1994 | Hamilton |
| D357,531 S | 4/1995 | Weick |
| 5,437,410 A | 8/1995 | Babasade |
| 5,526,966 A | 6/1996 | Lutzker |
| 5,690,275 A | 11/1997 | Bose et al. |
| 5,768,917 A | 6/1998 | Freida |
| 6,032,495 A | 3/2000 | Leu |
| 6,174,577 B1 | 1/2001 | Vitorino |
| 6,186,324 B1 | 2/2001 | Catterson |
| 6,245,230 B1 | 6/2001 | Ricci |
| 6,338,406 B1 | 1/2002 | Zagar |
| 6,363,947 B1 | 4/2002 | Wu |
| 6,457,583 B1 | 10/2002 | Tee et al. |
| D478,973 S | 8/2003 | Wagner |
| D509,890 S | 9/2005 | Stavale et al. |
| D509,894 S | 9/2005 | Hoyt et al. |
| 6,966,500 B1 | 11/2005 | Kelley |
| 7,350,720 B2 | 4/2008 | Jaworski et al. |
| 7,360,650 B2 | 4/2008 | Hoffecker |
| D579,163 S | 10/2008 | Schablinger |
| D584,391 S | 1/2009 | Howlett et al. |
| D617,439 S | 6/2010 | Valentino et al. |
| D639,922 S | 6/2011 | Howlett et al. |
| 8,240,503 B2 | 8/2012 | Curtin |
| 8,251,299 B1 | 8/2012 | Irvin |
| 8,523,020 B2 | 9/2013 | Abfall et al. |
| 8,550,290 B1 | 10/2013 | Davis |
| 8,671,499 B2 | 3/2014 | Lim et al. |
| 9,138,044 B2 | 9/2015 | Lim et al. |
| 9,220,391 B1 | 12/2015 | Henninger |
| 9,228,289 B2 | 1/2016 | Oh |
| 9,440,186 B2 | 9/2016 | Wasson |
| 9,897,378 B2 * | 2/2018 | Palmer ............ B65D 47/32 |
| 10,145,611 B1 * | 12/2018 | Palmer ............ F26B 21/12 |
| 10,458,706 B2 * | 10/2019 | Palmer ............ F26B 9/003 |
| 10,510,335 B2 | 12/2019 | Lazar et al. |
| 2005/0173277 A1 | 8/2005 | Rich |
| 2005/0268935 A1 | 12/2005 | Hoffecker |
| 2006/0101707 A1 | 5/2006 | James |
| 2007/0001025 A1 | 1/2007 | Caserta et al. |
| 2007/0021783 A1 | 1/2007 | Viana et al. |
| 2007/0181455 A1 | 8/2007 | Davis |
| 2008/0318308 A1 | 12/2008 | Hinchey |
| 2009/0165327 A1 | 7/2009 | Nekovar |
| 2010/0003175 A1 | 1/2010 | Gibson |
| 2010/0281928 A1 | 11/2010 | Martin |
| 2011/0180543 A1 | 7/2011 | Rusnak et al. |
| 2011/0284531 A1 | 11/2011 | Chen |
| 2012/0091221 A1 | 4/2012 | Levake et al. |
| 2012/0104113 A1 | 5/2012 | Abfall et al. |
| 2013/0186816 A1 | 7/2013 | Kepner et al. |
| 2014/0013501 A1 | 1/2014 | Murphy et al. |
| 2014/0154153 A1 | 6/2014 | Averdam et al. |
| 2015/0272416 A1 | 10/2015 | Lu |
| 2016/0000958 A1 | 1/2016 | Matias |
| 2016/0278588 A1 | 9/2016 | Caldwell et al. |
| 2016/0302389 A1 | 10/2016 | Christensen |
| 2018/0168333 A1 | 6/2018 | Zeilah |
| 2020/0046103 A1 * | 2/2020 | Silva ............ A45D 40/26 |

FOREIGN PATENT DOCUMENTS

| | | |
|---|---|---|
| CN | 201801065 U | 4/2011 |
| CN | 102665485 A | 9/2012 |
| CN | 102665485 B | 6/2015 |
| CN | 204507583 U | 7/2015 |
| CN | 305674976 | 4/2020 |
| DE | 2322360 A1 | 11/1973 |
| FR | 1596401 A | 6/1970 |
| FR | 2231216 | 12/1974 |
| FR | 2833531 A1 | 6/2003 |
| FR | 2833531 B1 | 6/2004 |
| GB | 191304814 A | 4/1913 |
| JP | H09341 U | 6/1997 |
| JP | 2005143736 A | 6/2005 |
| JP | 2012035257 A | 2/2012 |
| JP | 2016527972 A | 9/2016 |
| KR | 20130095531 A | 8/2013 |
| KR | 20160025871 A | 3/2016 |
| KR | 20160059377 A | 5/2016 |
| KR | 20160002585 U | 7/2016 |
| KR | 101678822 B1 | 11/2016 |
| KR | 200484247 Y1 | 8/2017 |
| TW | M493302 | 1/2015 |
| TW | M493302 U | 1/2015 |
| WO | 2003008000 A1 | 1/2003 |
| WO | 2003070287 A1 | 8/2003 |
| WO | 2003101499 A1 | 12/2003 |
| WO | 2007048178 A1 | 5/2007 |

* cited by examiner

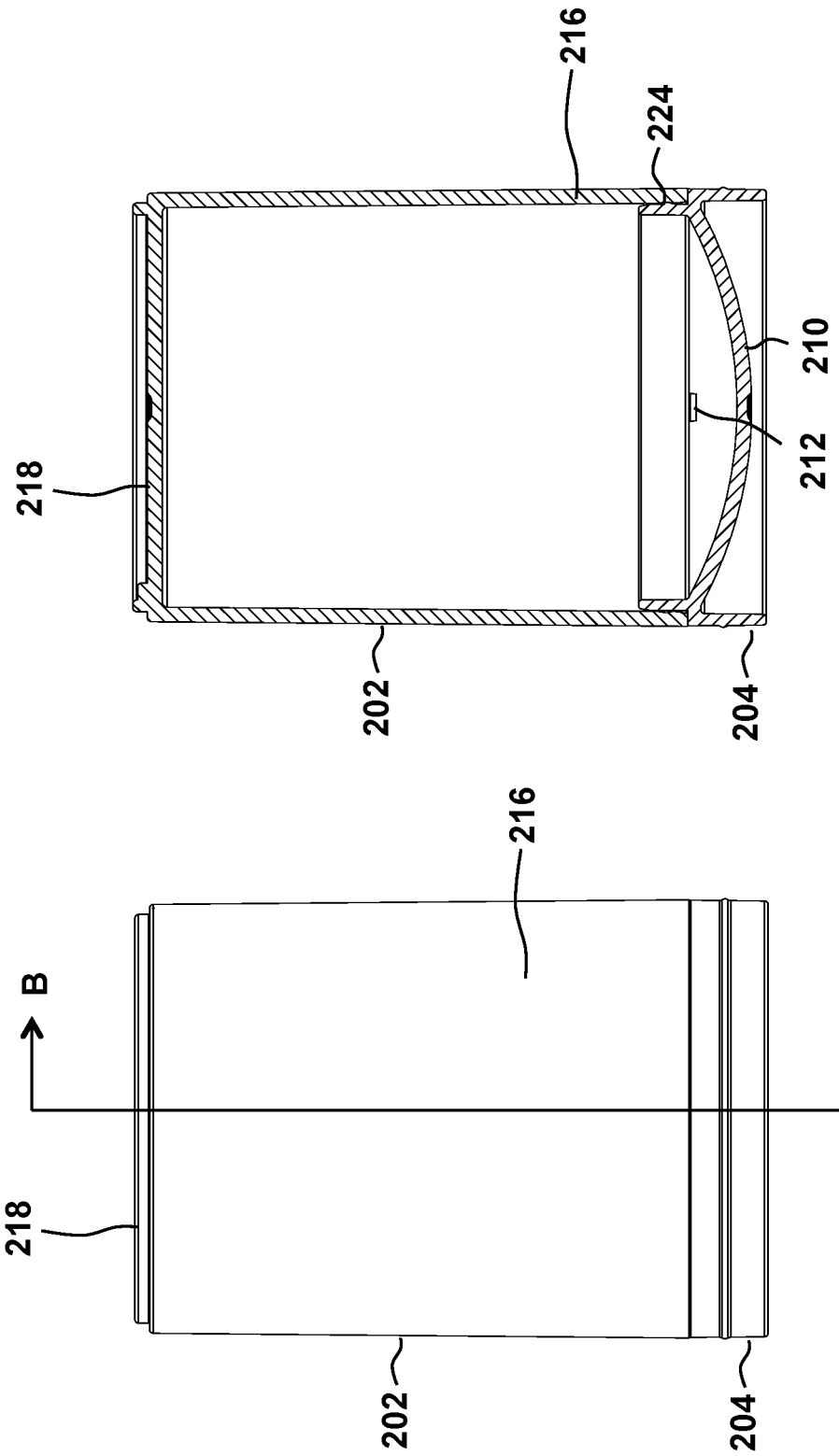

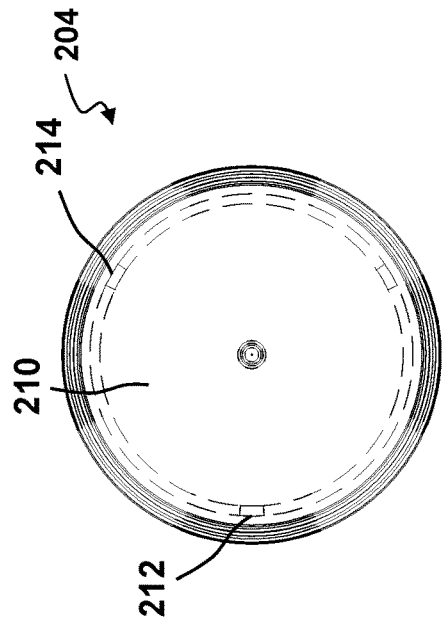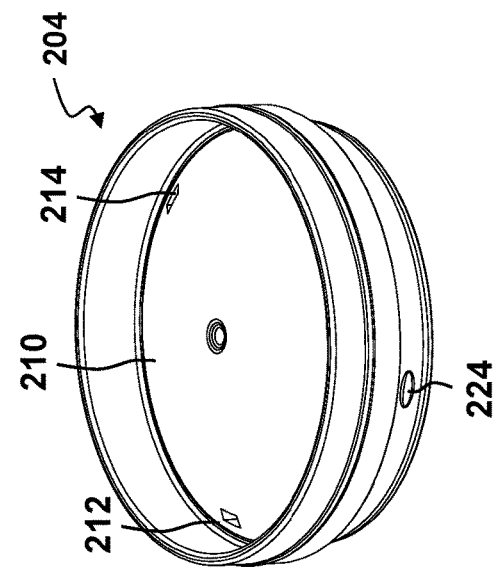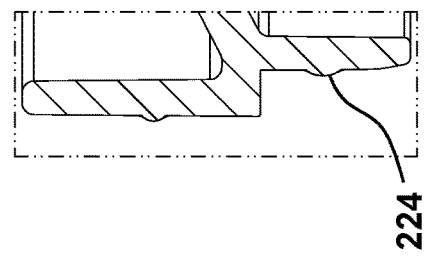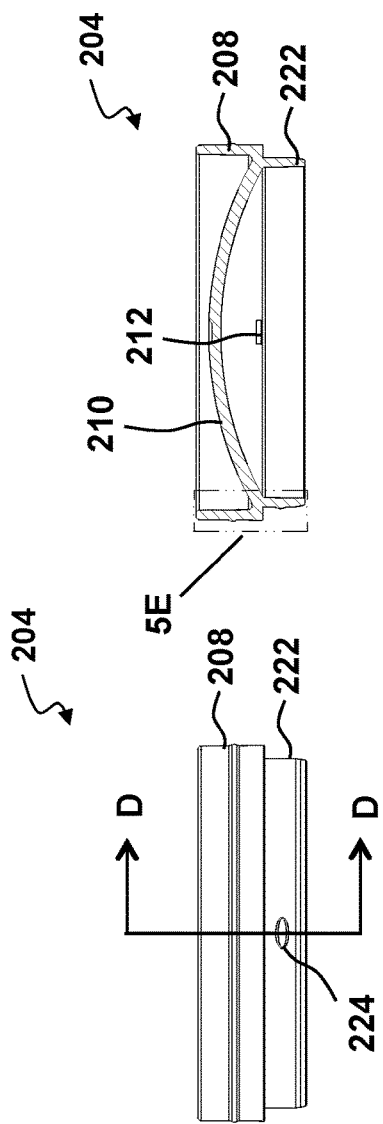
FIG. 5A
FIG. 5B
FIG. 5C
FIG. 5D
FIG. 5E

CONTAINER FOR COSMETIC SPONGE APPLICATOR

CROSS-REFERENCE TO RELATED APPLICATIONS

This application claims priority to and the benefit of U.S. Provisional Patent Application No. 62/803,397, filed Feb. 8, 2019, the contents of which are hereby incorporated by reference herein for all purposes.

TECHNICAL FIELD

Embodiments relate generally to cosmetics, and more particularly to cosmetic holders.

BACKGROUND

Users may desire to take, display, and/or carry their cosmetic sponge with them. However, cosmetic sponges can be delicate and may be damaged during travel, such as by being crushed in a bag or torn by an object with sharp edges. Cosmetic sponges may increase greatly in size when damp and take several hours to dry and to return to their original size. As a result, storage options for dry cosmetic sponges may not accommodate dampened cosmetic sponges.

SUMMARY

A device embodiment may include a container comprising: a base portion configured to receive a cosmetic sponge; a cap portion configured to be detachably attached to the base portion; and one or more apertures disposed in the cap portion, where the one or more apertures provide airflow into the container.

In additional device embodiments, the cosmetic sponge may be a dampened cosmetic sponge, and the dampened cosmetic sponge may be greater in size than a dry cosmetic sponge. In additional device embodiments, the cap portion may be detachably attached to the base portion via a friction fit. In additional device embodiments, the base portion may be made from a transparent material.

Additional device embodiments may further include: one or more apertures disposed in the base portion, where the one or more apertures may provide airflow into the container. In additional device embodiments, the base portion may include a curved end. In additional device embodiments, the cap portion may include a curved end. In additional device embodiments, the curved end of the base portion may be configured to align the cosmetic sponge upright in the container by supporting a curvature of the cosmetic sponge via a curvature of the curved end of the base portion. In additional device embodiments, the aligned cosmetic sponge may not contact inside walls of the base portion in the upright alignment.

In additional device embodiments, the curved end of the base portion may prevent deformation of the cosmetic sponge. In additional device embodiments, at least one of the one or more apertures disposed in the base portion may be disposed in the curved end. In additional device embodiments, at least one of the one or more apertures disposed in the base portion may be disposed in a middle portion of the base portion.

Additional device embodiments may further include: a second cap portion configured to be detachably attached to the base portion, where the cap portion may be detachably attached to the base portion at a first opening of the base portion, where the second cap portion may be detachably attached to the base portion at a second opening of the base portion, and where the second cap portion may be disposed distal from the cap portion. In additional device embodiments, the base portion may be configured to receive a cleansing solution to immerse the cosmetic sponge in the cleansing solution within the base portion in a first position, where the base portion may be proximate a surface in the first position. In additional device embodiments, the cleansing solution may be configured to drain from the base portion via the one or more apertures disposed in the cap portion in a second position, where the cap portion may be proximate the surface in the second position. In additional device embodiments, the curved end of the cap portion may be configured to receive makeup for absorption by the cosmetic sponge.

Additional device embodiments may further include: an upper lip portion of the cap portion, where the upper lip portion may extend out from the cap portion so as to provide a separation from the curved end of the cap portion, where the base portion may be in contact with a surface in a first position, and where the upper lip portion may be in contact with the surface in a second position. In additional device embodiments, the upper lip portion may be configured to receive excess makeup from the cosmetic sponge by dragging a portion of the cosmetic sponge containing the excess makeup across the upper lip portion such that the excess makeup collects between the upper lip portion and the curved end of the cap portion.

Additional device embodiments may further include: a lower lip portion of the cap portion, where the lower lip portion may extend out from the cap portion and away from the upper lip portion, where an outer diameter of the lower lip portion may be configured to fit within an inner diameter of a middle portion of the base portion, and where the outer diameter of the lower lip portion may be substantially the same as the inner diameter of a middle portion of the base portion. Additional device embodiments may further include: one or more lower lip protrusions disposed on an outer surface of the lower lip portion, where the one or more lower lip protrusions may secure the lower lip portion to the middle portion of the base portion by a friction fit.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 3B depicts a side view of the container of FIG. 3A, according to one embodiment;

FIG. 3C depicts a cross-sectional view of the container of FIG. 3B about line B-B, according to one embodiment;

FIGS. 5A-5E depict perspective, top, side, cross-sectional, and close-up views of a cap portion, according to one embodiment;

DETAILED DESCRIPTION

The disclosed system allows for a container to secure a cosmetic sponge and/or other similar cosmetic applicator tools to allow for transport, storage, display, and/or drying of the cosmetic sponge.

Figure 1B:
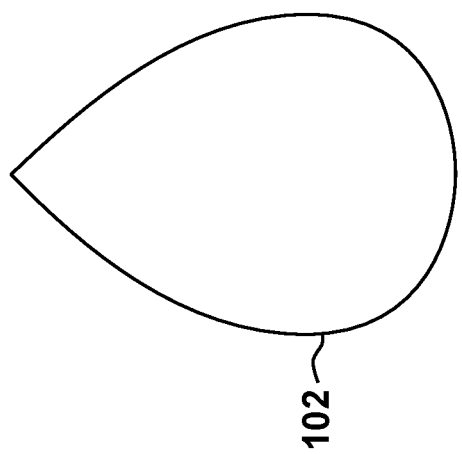
FIG. 1B depicts a dampened cosmetic sponge, according to one embodiment.
Figure 1A:
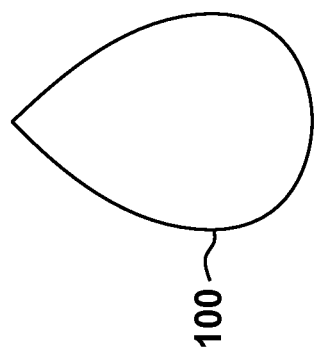
FIG. 1A depicts a dry cosmetic sponge, according to one embodiment.

FIG. 1A depicts a dry cosmetic sponge 100, according to one embodiment. The cosmetic sponge may have a general teardrop shape as shown, an oval shape, or a shape with any number of contours. The various angles of the cosmetic sponge 100 allow the cosmetic sponge 100 to be used on various portions of a user's skin. The various angles of the cosmetic sponge 100 also may make the cosmetic sponge 100 susceptible to rolling on a flat surface, such as a countertop. The material of the cosmetic sponge 100 may make the cosmetic sponge 100 susceptible to damage if stored with other objects, such as in a purse, handbag, or makeup container.

FIG. 1B depicts a dampened cosmetic sponge 102, according to one embodiment. The cosmetic sponge (100, FIG. 1A) may be dampened, such as with water, prior to use. Adding water to the cosmetic sponge (100, FIG. 1A) causes the dampened cosmetic sponge 102 to increase greatly in size. The dampened cosmetic sponge provides a greater surface area and absorption for applying makeup, foundation, or the like. Once the dampened cosmetic sponge 102 has been used for its intended purpose, the cosmetic sponge 102 may remain at the larger size for several hours before drying and returning to its original size. As a result, the dampened cosmetic sponge 102 may not fit in original packaging or space it fit prior to use. Squishing the dampened cosmetic sponge 102 to fit in original packaging or space may cause damage or the dampened cosmetic sponge 102 and/or reduce the lifetime of the dampened cosmetic sponge 102. Due to its increased size of the cosmetic sponge 102, the dampened cosmetic sponge 102 is more difficult to store and more susceptible to rolling on a flat surface than the dry cosmetic sponge 100.

Figure 2A:
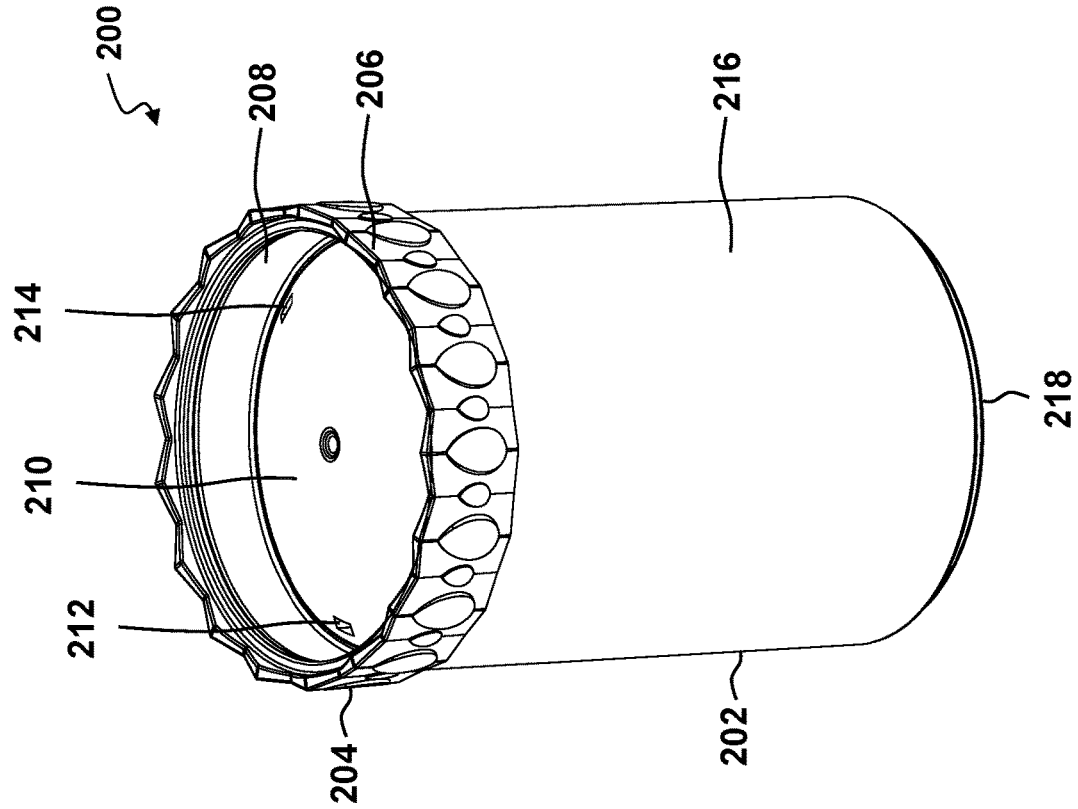
FIG. 2A depicts a perspective view of a container with an outer ring attached, according to one embodiment.
Figures 2B, 2C:
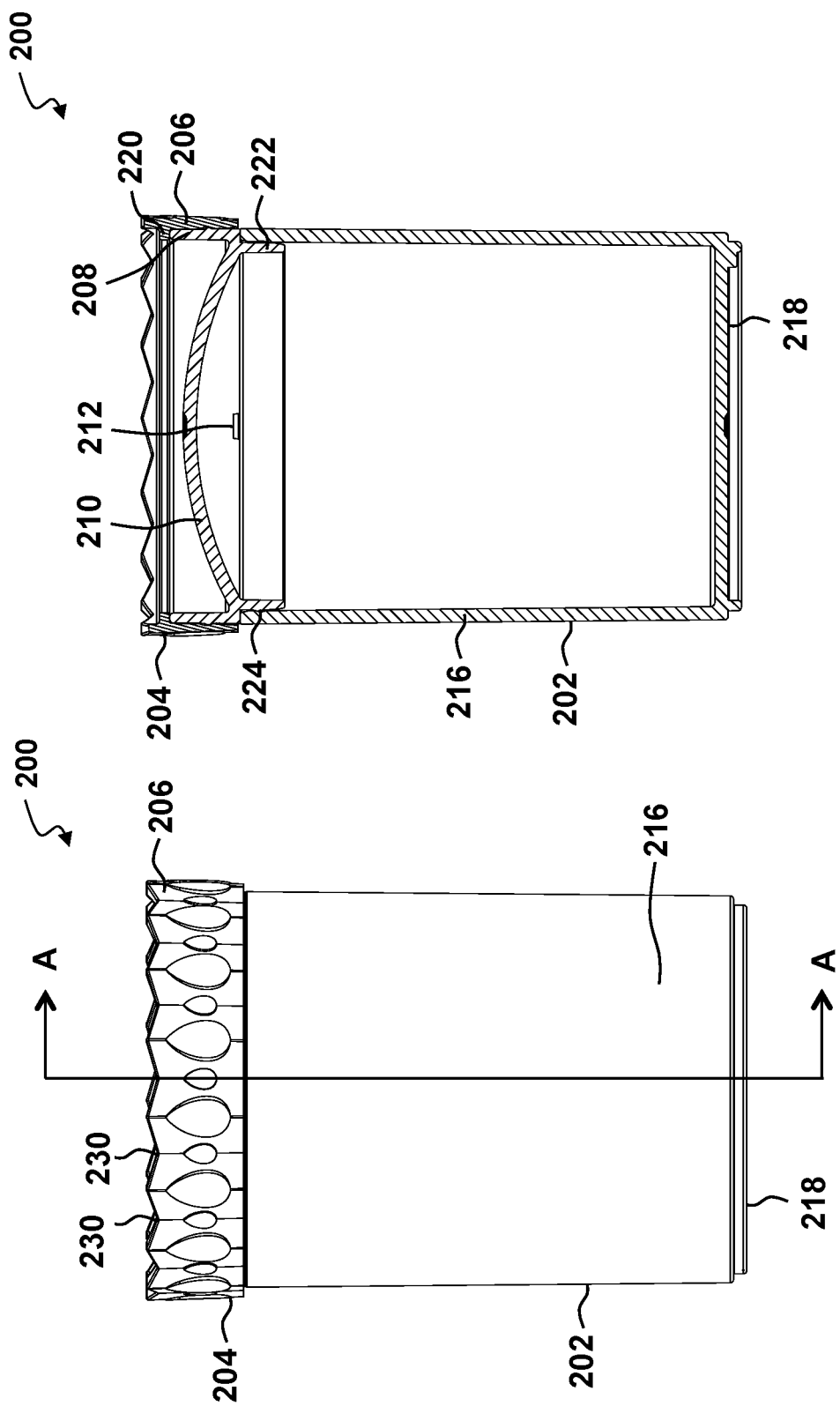
FIG. 2B depicts a side view of the container of FIG. 2A, according to one embodiment.
FIG. 2C depicts a cross-sectional view of the container of FIG. 2B about line A-A, according to one embodiment.

FIG. 2A depicts a perspective view of a container 200, according to one embodiment. FIG. 2B depicts a side view of the container 200 of FIG. 2A, according to one embodiment. FIG. 2C depicts a cross-sectional view of the container 200 of FIG. 2B about line A-A, according to one embodiment. The container 200 may include a base portion 202 and a cap portion 204. The cap portion 204 may include an outer ring 206. In some embodiments, the cap portion 204 may not include an outer ring. The outer ring may have a pattern or a repeating pattern, such as a crown. In some embodiments, the outer ring 206 may be detachably attached to an upper lip portion 208 of the cap portion 204. The outer ring 206 may be swapped with other outer rings having different shapes, designs, functions, and the like. In other embodiments, the outer ring 206 may be fixedly attached to the upper lip portion 208 of the cap portion 204.

The cap portion 204 may include a surface 210 having one or more apertures 212, 214. In some embodiments, the surface 210 of the cap portion 204 may have three equally spaced apertures 212, 214. The apertures 212, 214 may provide airflow into the container 200, which may allow a dampened cosmetic sponge (102, FIG. 1B) inside the container 200 to dry out and return to the cosmetic sponge's original size, as shown in FIG. 1A. The apertures 212, 214 may allow the cosmetic sponge to dry without any buildup of water inside the container 200. In one embodiment, the container 200 may house more than one cosmetic sponge (e.g., cosmetic sponge 100 and dampened cosmetic sponge 102).

The base portion 202 may have an open end for detachably attaching to the cap portion 204. A closed end 218 may be disposed distal from the open end. A middle portion 216 of the base portion 202 may connect the open end and the closed end 218 of the base portion 202. In some embodiments, the middle portion may be made from a transparent material, such as clear plastic, to allow a user to see a dampened cosmetic sponge (102, FIG. 1B) inside the container 200 and determine whether the cosmetic sponge has dried based on the size of the cosmetic sponge. In other embodiments, the middle portion may be opaque or partially opaque, such as a textured surface, tinted color, contain one or more graphics, or the like.

The outer ring 206 may include an outer ring lip 220. The outer ring lip 220 may fit over the upper lip portion 208 of the cap portion 204. The cap portion 204 may also include a lower lip portion 222. The lower lip portion 222 may include one or more lower lip portion protrusions 224. The lower lip portion protrusions 224 may be substantially oval, circular, or any other shape. The outer diameter of the lower lip portion 222 may fit within the inner diameter of the middle portion 216 of the base portion 202. The outer diameter of the lower lip portion 222 may be substantially the same as the inner diameter of the middle portion 216 of the base portion 202. The one or more lower lip portion protrusions 224 may secure the lip portion 204 to the base portion 202, such as by a friction fit. In some embodiments, the middle portion 216 of the base portion 202 may include one or more indentations for receiving the one or more lower lip portion protrusions 224.

The container 200 may be placed on a surface, such as a countertop, with the base portion 202 proximate the surface. In other embodiments, the container 200 may be placed on the surface with the cap portion 204 proximate the surface. The repeating pattern of the outer ring 206 may provide separation between the outer ring 206 and the surface, allowing airflow to flow through this separation and into the one or more apertures 212, 214. In some embodiments, a varying dimension of the outer ring 206 may also provide separation between the outer ring 206 and the surface. That is, according to the embodiments disclosed, the container 200 may be interchangeably placed on a local plane surface right side up or upside down while still providing airflow to the items inside the base portion 202. In such embodiments, the cap portion 204 may provide an extended volume under the container 200 by creating separation 230 from the surface and the upper lip portion 208. Thereby the airflow and air-drying of the item inside, for example, a cosmetic applicator, may be achieved in either position that the container 200 is placed on the local plane, where the local plane may be substantially parallel to the ground. In addition, the one or more apertures disposed along the cap portion 204 may provide breathing holes to prevent moisture build-up or mold as the ventilated design allows the cosmetic applicators to breathe while air-drying.

Figure 2D:
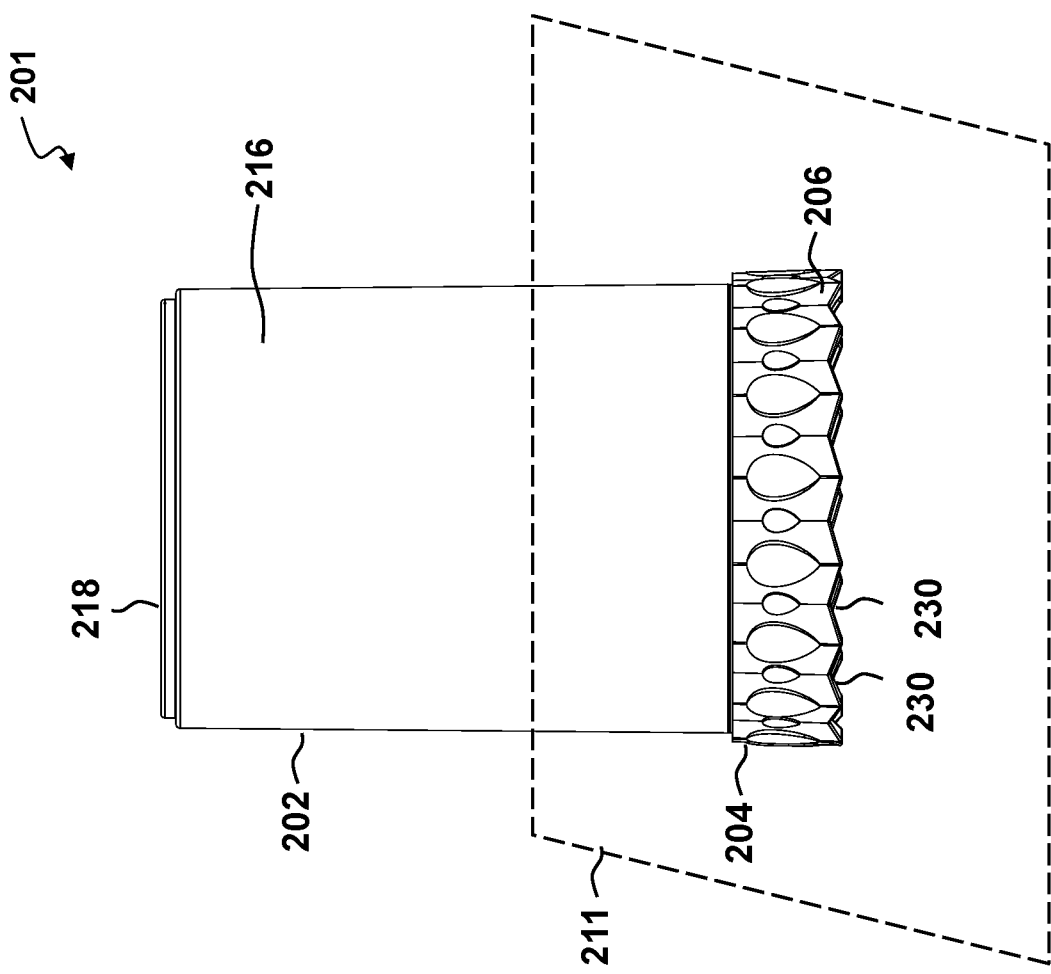
FIG. 2D depicts a side view of the container in a reverse position compared to FIG. 2B, according to one embodiment.

While FIGS. 2A-2C depict the container 200 with the base portion 202 proximate the local plane and the cap portion 204 distal the local plane, FIG. 2D depicts the container 201 with the base portion 202 distal the local plane 211 and the cap portion 204 proximate the local plane 211, and as described this position may be the reverse of FIG. 2C, but still allowing substantially the same airflow for air-drying into the base portion 202. In one such embodiment, the outer ring may have a pattern or a repeating pattern, such that the pattern creates and/or provides apertures with the local plane by having, for example, portions that are of differing lengths, some longer and some shorter, or apertures where for example, the tear drop design shows in FIGS. 2A-2C are cutout portions and open to airflow.

Figure 3A:
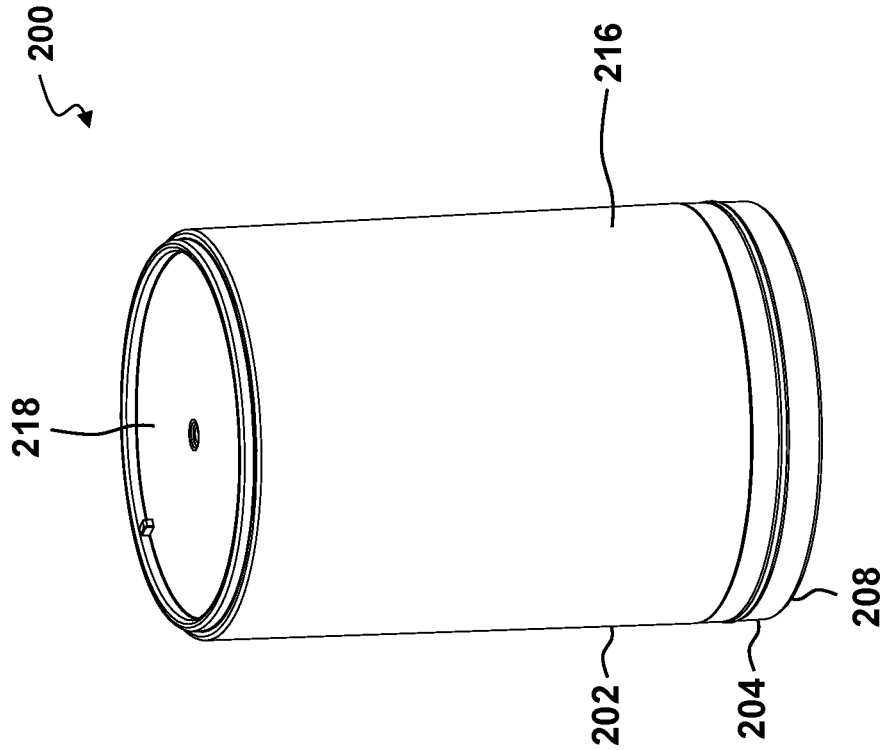
FIG. 3A depicts a perspective view of a container without an outer ring attached, according to one embodiment.

FIG. 3A depicts a perspective view of a container 200 without an outer ring attached, according to one embodiment. In some embodiments, the container 200 may not use an outer ring. FIG. 3B depicts a side view of the container 200 of FIG. 3A, according to one embodiment. FIG. 3C depicts a cross-sectional view of the container 200 of FIG. 3B about line B-B, according to one embodiment. In some embodiments, the container may not include an outer ring, as shown in FIGS. 2A-2C. In other embodiments, the container 200 may be configured to receive one or more rings, such as rings having various shapes, repeating patterns, indicia, and the like. In some embodiments, the rings may include weights, magnets, or the like for securing the container 200.

Figure 4B:
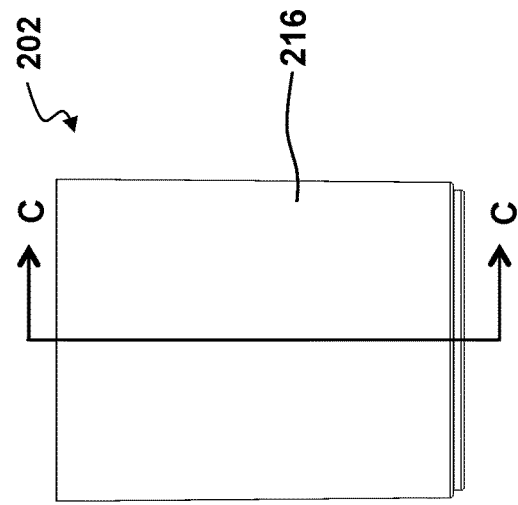
FIGS. 4A-4D depict perspective, side, cross-sectional, and close-up views of a base portion, according to one embodiment.
Figure 4D:
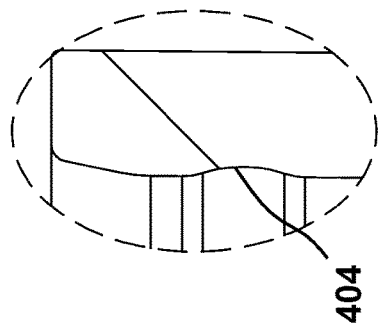
Figure 4A:
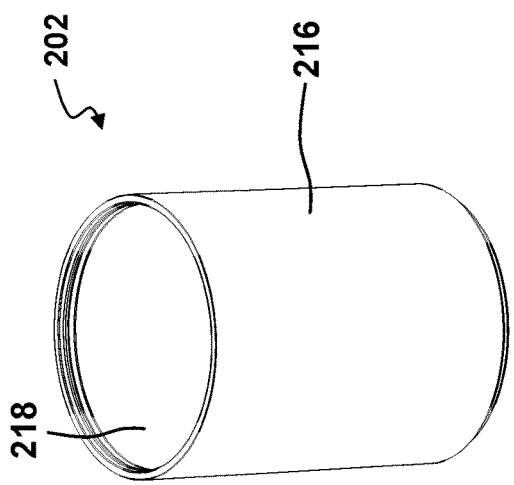
Figure 4C:
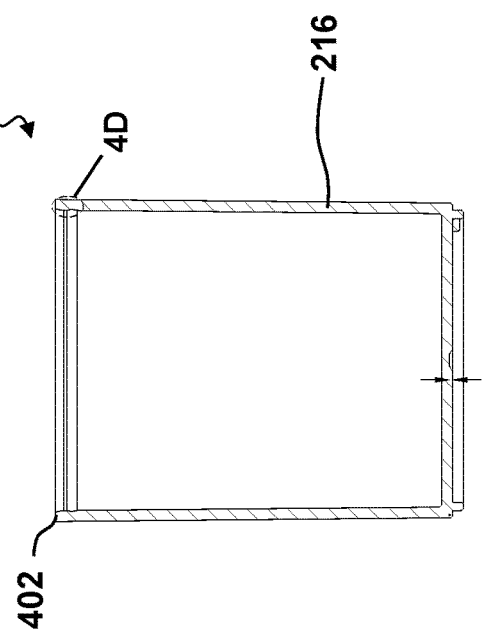

FIGS. 4A-4D each respectively depict perspective, side, cross-sectional, and close-up views of a base portion 202, according to one embodiment. FIG. 4C depicts a cross-sectional view of the container of FIG. 4B about line C-C. In some embodiments, the base portion 202 may include one or more indentations 404 for receiving the one or more lower lip portion protrusions (224, FIG. 2C). The one or more lower lip protrusions may fit into the one or more indentations 404 to detachably attach the base portion 202 to the cap portion (204, FIG. 1A).

FIGS. 5A-5E each respectively depict perspective, top, side, cross-sectional, and close-up views of a cap portion 204, according to one embodiment. FIG. 5D depicts a cross-sectional view of the container of FIG. 5C about line D-D. The one or more apertures 214, 212 may be disposed on the cap portion 204 to allow airflow into and out of the container 200 such that a cosmetic sponge inside can dry and water can evaporate out of the container.

Figure 6B:
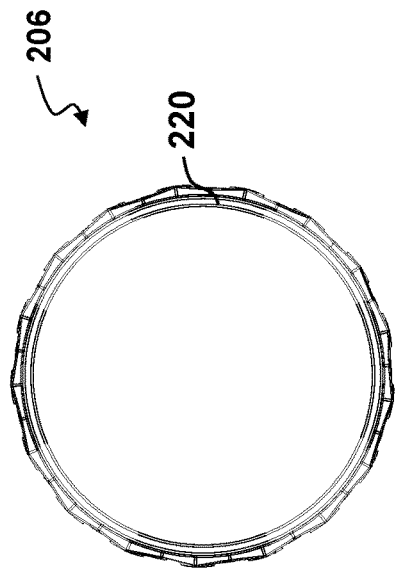
FIGS. 6A-6E depict perspective, top, side, cross-sectional, and close-up views of an outer ring, according to one embodiment.
Figure 6E:
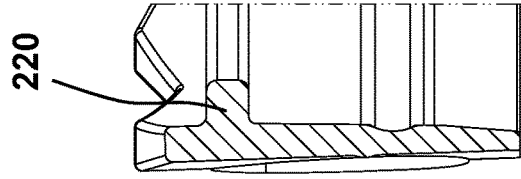
Figure 6A:
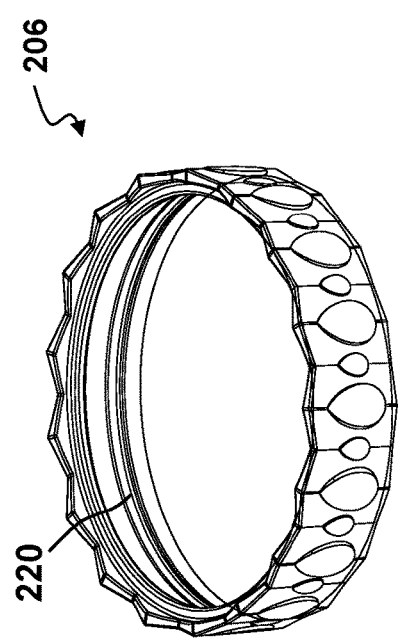
Figure 6D:
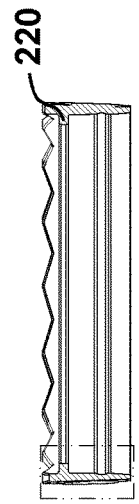
Figure 6C:
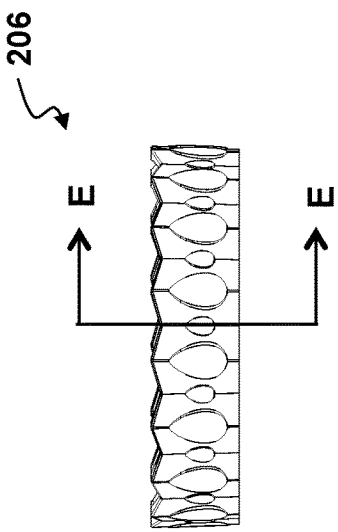

FIGS. 6A-6E each respectively depict perspective, top, side, cross-sectional, and close-up views of an outer ring 206, according to one embodiment. FIG. 6D depicts a cross-sectional view of the container of FIG. 6C about line E-E. The outer ring 206 may be detachably attached to the cap portion (204, FIG. 5A). The outer ring 206 may have a repeatable pattern, design, or other shapes so as to distinguish containers, provide grip to a user for removing the cap portion, or the like.

As disclosed in the different embodiments, the cap portion 204 may provide a platform type stand for a cosmetic applicator so that the concave shaped cap portion 204 may receive the cosmetic applicator in an upright position. The cap portion 204 may also balance the cosmetic applicator in the upright position by having a curvature 210 (710, FIG. 7) that is substantially the same as the curvature of the bottom portion of the cosmetic applicator. In one embodiment, the base portion 202 may not be needed or be left out so that if used for displaying, the cap portion 204 (706, FIG. 7) may stay in position. In some embodiments, as disclosed above, an outer ring may have a pattern or a repeating pattern, such as a crown, around the cap portion used to stabilize and keep the cosmetic applicator in an upright position—demonstrating or exhibiting the cosmetic applicator as sitting on a crown.

In one embodiment, with the cap portion 204 proximate the local plane (e.g., the lower lip portion 222 resting on a parallel surface), the dampened cosmetic sponge 102 may lie horizontally on the upper lip portion 208 of the cap portion 204. In such an arrangement, the dampened cosmetic sponge 102 may have minimal contact with the upper lip portion 208, allowing for efficient air drying of the dampened cosmetic sponge. In another embodiment, the base portion 202 of the container 200 may be placed upside down on a parallel surface, and the cap portion 204 may seat on top of the bottom side of the base portion 202. More specifically, the upper lip portion 208 of the cap portion 204 may slide over a ledge of the closed end 218 of the base portion 202, allowing the cap portion 204 to rest on top of the bottom side of the base portion 202. The dampened cosmetic sponge 102 may then be placed horizontally on the upper lip portion 208 of the cap portion 204 for air-drying, as described above. In one embodiment, more than one dampened cosmetic sponge 102 may be placed horizontally on the upper lip portion 208 of the cap portion 204 for air-drying, as described above.

In one embodiment, the container 200 may be filled with a cleansing solution, such as water, and the cosmetic sponge 100 may be placed in the container 200 for washing of the cosmetic sponge 100 in a first position where the base portion 202 is disposed proximate a surface. In some embodiments, one or more cleansers, such as a cosmetic sponge cleaner, may be added to the cleansing solution. The cap portion 204 may then be secured to the base portion 202, and the container 200 may be flipped upside down in a second position where the cap portion 204 is disposed proximate the surface. Water may then escape the container 200 through apertures 212, 214. Upon evacuation of the water from the container 200, air will enter the container 200 through the apertures 212, 214 for air-drying of the cosmetic sponge 100.

In one embodiment, with the cap portion 204 proximate the local plane (e.g., the lower lip portion 222 resting on a parallel surface), the curvature 210 of the cap portion 204 may provide for holding makeup, foundation, or the like. A user may then absorb the makeup from the curvature 210 with the cosmetic sponge 100 for application. In another embodiment, the base portion 202 of the container 200 may be placed upside down on a parallel surface, and the cap portion 204 may seat on top of the bottom side of the base portion 202. More specifically, the upper lip portion 208 of the cap portion 204 may slide over a ledge of the closed end 218 of the base portion 202, allowing the cap portion 204 to rest on top of the bottom side of the base portion 202. Makeup, foundation, or the like may be added to the curvature 210 for absorption by the cosmetic sponge 100 and application of the makeup with the cosmetic sponge 100. In one embodiment, more than one cosmetic sponge 100 may absorb makeup, foundation, or the like for application with the one or more cosmetic sponges 100.

In one embodiment, the container 200 with the cosmetic sponge 100 inside may be flipped upside down for storage of the cosmetic sponge while the cosmetic sponge is still damp (e.g., dampened cosmetic sponge 102). With the cap portion 204 proximate the local plane (e.g., facing a countertop or other parallel surface), the apertures 212, 214 may be sealed off and little-to-no air may enter the container 200. Therefore, the dampened cosmetic sponge 102 may not acquire bacteria or mold from outside the container 200, and the dampened cosmetic sponge 102 may be used shortly after storage for reapplication of makeup, foundation, or the like. In another embodiment, the cosmetic sponge 100 is a dry cosmetic sponge, and the dry cosmetic sponge 100 may not acquire bacteria or mold due to the sealing of the apertures 212, 214, allowing for prolonged storage of the dry cosmetic sponge 100 in the container 200. In another embodiment, the container 200 may contain more than one dampened cosmetic sponge 102, and the more than one dampened cosmetic sponge 102 may not acquire bacteria or mold from outside the container 200, and the more than one dampened cosmetic sponge 102 may be used shortly after storage for reapplication of makeup, foundation, or the like. In another embodiment, the container 200 may contain more than one dry cosmetic sponge, and the dry cosmetic sponges 100 may not acquire bacteria or mold due to the sealing of the apertures 212, 214, allowing for prolonged storage of the dry cosmetic sponges 100 in the container 200.

In one embodiment, the base portion 202 of the container 200 may be placed upside down on a parallel surface (e.g., a countertop), and the dampened cosmetic sponge 102 may be placed on the closed end of the base portion 202. A user may then use the cap portion 204 to push the dampened cosmetic sponge 102 towards the bottom side of the base portion 202 to squeeze excess water from the dampened cosmetic sponge 102 to provide for faster drying of the dampened cosmetic sponge 102. In another embodiment, if the container 200 contains more than one dampened cosmetic sponge 102, then a user may then use the cap portion 204 to push the dampened cosmetic sponges 102 towards the bottom side of the base portion 202 to squeeze excess water from the dampened cosmetic sponges 102 to provide for faster drying of the dampened cosmetic sponges 102. In some embodiments, the cap portion 204 may be used to press the cosmetic sponge 102 between the cap portion 204 and a surface, countertop, hand, or the like to squeeze excess water from the dampened cosmetic sponge 102. The curvature 210 of the cap portion 204 may have a complementary curvature to the curvature of the cosmetic sponge 102 so as to secure the cosmetic sponge 102 when squeezing out excess water. In another embodiment, if the container 200 contains more than one dampened cosmetic sponge 102, then a user may use the cap portion 204 to press one cosmetic sponge 102 at a time between the cap portion 204 and a surface, countertop, hand, or the like to squeeze excess water from the dampened cosmetic sponge 102. In another embodiment, if the container 200 contains more than one dampened cosmetic sponge 102, then a user may use the cap portion 204 to press all of the cosmetic sponges 102 at once between the cap portion 204 and a surface, countertop, hand, or the like to squeeze excess water from the dampened cosmetic sponges 102. In yet another embodiment of the container 200 containing more than one dampened cosmetic sponge, a divider, for example, a flow divider, may be placed between the sponges to prevent them from touching each other. The divider may comprise one or more apertures to allow air flow between the separated volumes for drying the more than one dampened cosmetic sponges. Additionally, in some embodiments, the divider may be in the form of discs and sized the same as the inner circumference of the container and providing a tight fit to allow the dividers to stand in place absent any other force. Thereby, using a friction fit, for example, the dividers may themselves provide a platform or stand similar to the cap portion thereby allowing a multi-level display of cosmetic sponges within the same container.

In one embodiment, with the cap portion 204 proximate the local plane (e.g., the lower lip portion 222 resting on a parallel surface) or held between the fingers of a user with the lower lip portion 222 facing downwards, the cosmetic sponge 100 may be cleaned of excess makeup (e.g., if the user applied more makeup to the cosmetic sponge 100 than desired) by dragging the cosmetic sponge 100 across the upper lip portion 208 of the cap portion 204.

Figure 7:
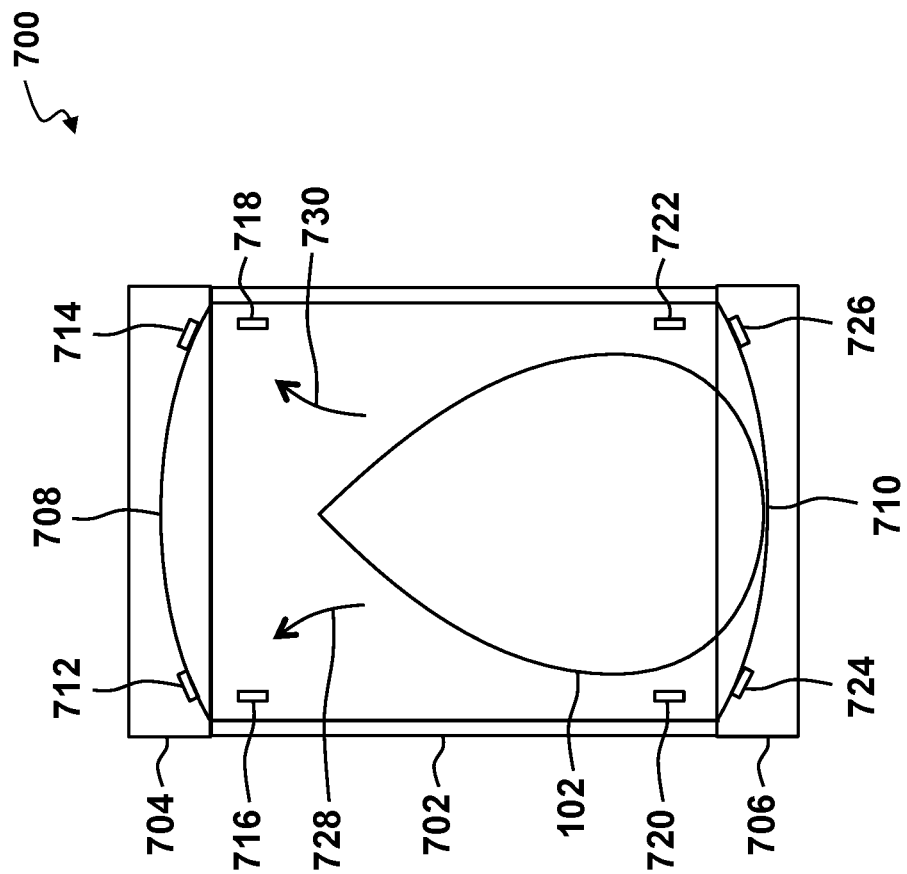
FIG. 7 depicts a side view of an alternate container, according to one embodiment.

FIG. 7 depicts a side view of an alternate container 700, according to one embodiment. The container 700 may include a base portion 702 and one or more cap portions 704, 706. In some embodiments, the container 700 may only contain a single cap portion 704 or 706. In other embodiments, the container 700 may contain two cap portions 704, 706. The one or more cap portions 704, 706 may be fixedly attached to the base portion 702 and/or detachably attached to the base portion 702. Each cap portion 704, 706 may include a curved end 708, 710. In other embodiments, one or more cap portions 704, 706 may include a flat end. The one or more curved ends 708, 710 may prevent deformation of a cosmetic sponge 102 inside the container. The one or more curved ends 708, 710 may also assist with aligning the cosmetic sponge 102 upright in the container such that a curvature of the cosmetic sponge 102 is supported by a curvature of the curved end 708, 710. In one embodiment, the container 700 may house more than one cosmetic sponge (e.g., cosmetic sponge 100 and dampened cosmetic sponge 102).

The container may include one or more apertures 712, 714, 716, 718, 720, 722, 724, 726. The one or more apertures 712, 714, 716, 718, 720, 722, 724, 726 may allow for airflow into and out of the container such that the dampened cosmetic sponge 102 can evaporate 728, 730 and water does not pool inside the container 700. The one or more apertures 712, 714, 716, 718, 720, 722, 724, 726 may be disposed in the base portion 702 and/or the one or more cap portions 704, 706.

In some embodiments, the one or more cap portions 704, 706 may detachably attach to the base portion 702 via a friction or interference fit. In other embodiments, the one or more cap portions 704, 706 may detachably attach to the base portion 702 via screw threads, magnets, or the like. The container 700 may be made from a transparent material, such as Polyethylene terephthalate glycol-modified (PETG).

Figure 8:
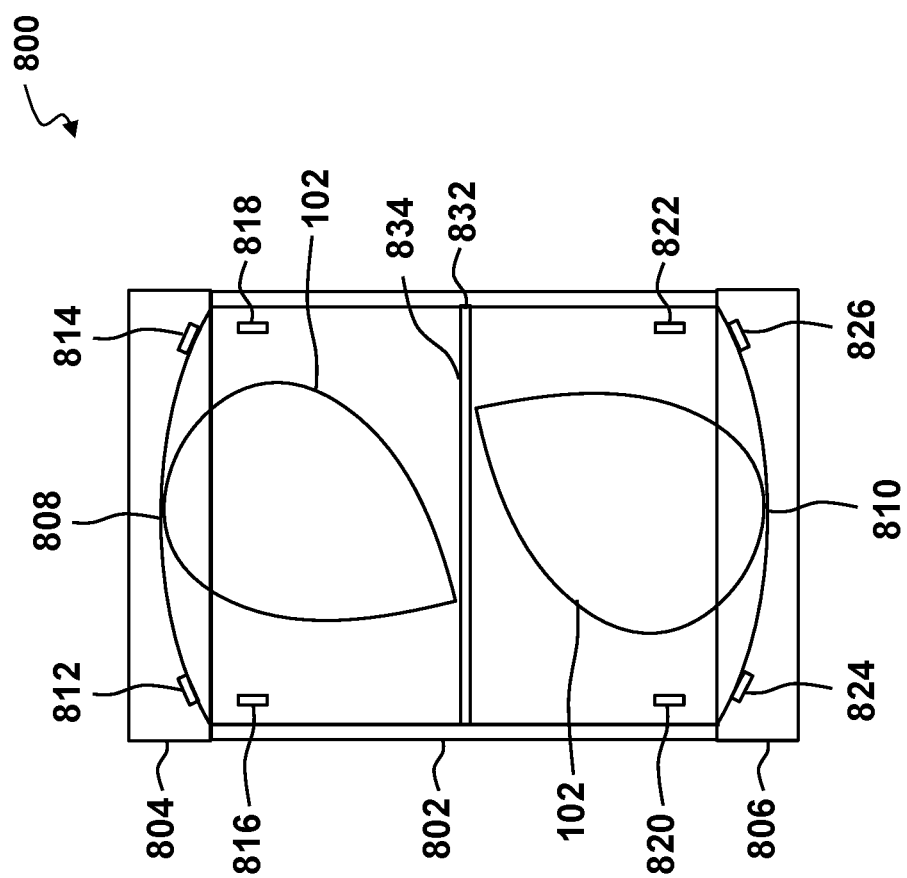
FIG. 8 depicts a side view of an alternate container, according to one embodiment.

FIG. 8 depicts a side view of an alternate container 800, according to one embodiment. The container 800 may include a base portion 802 and one or more cap portions 804, 806. In some embodiments, the container 800 may only contain a single cap portion 804 or 806. In other embodiments, the container 800 may contain two cap portions 804, 806. The one or more cap portions 804, 806 may be fixedly attached to the base portion 802 and/or detachably attached to the base portion 802. Each cap portion 804, 806 may include a curved end 808, 810. In other embodiments, one or more cap portions 804, 806 may include a flat end. The one or more curved ends 808, 810 may prevent deformation of one or more cosmetic sponges 102 inside the container. The one or more curved ends 808, 810 may also assist with aligning the one or more cosmetic sponges 102 upright in the container such that a curvature of the one or more cosmetic sponges 102 are supported by a curvature of the curved end 808, 810. In one embodiment, the container 800 may house more than one cosmetic sponge (e.g., cosmetic sponge 100 and dampened cosmetic sponge 102).

The container may include one or more apertures 812, 814, 816, 818, 820, 822, 824, 826. The one or more apertures 812, 814, 816, 818, 820, 822, 824, 826 may allow for airflow into and out of the container such that the one or more dampened cosmetic sponges 102 can evaporate and water does not pool inside the container 800. The one or more apertures 812, 814, 816, 818, 820, 822, 824, 826 may be disposed in the base portion 802 and/or the one or more cap portions 804, 806.

In some embodiments, the one or more cap portions 804, 806 may detachably attach to the base portion 802 via a friction or interference fit. In other embodiments, the one or more cap portions 804, 806 may detachably attach to the base portion 802 via screw threads, magnets, or the like. The container 800 may be made from a transparent material, such as Polyethylene terephthalate glycol-modified (PETG).

In some embodiments, the container 800 may contain one or more dividers 832 for separating one or more dampened cosmetic sponges 102. In one embodiment, the divider 832 may be a flow divider that may be placed between the sponges 102 to prevent the sponges 102 from touching each other. The divider 832 may comprise one or more apertures 834 to allow air flow between the separated volumes for drying the more than one dampened cosmetic sponges 102. In other embodiments, the divider may be solid to separate a dry cosmetic sponge from a dampened cosmetic sponge 102. Additionally, in some embodiments, the divider 832 may be disc-sized to have a same or similar dimensions as an inner circumference of the container 800 and providing a tight fit to allow the one or more dividers 832 to remain in place absent any other force. Thereby, using a friction fit, for example, the one or more dividers 832 may themselves provide a platform or stand similar to the cap portion thereby allowing a multi-level display of cosmetic sponges within the same container. In some embodiments, the one or more dividers 834 may have a curved surface to receive a curved surface of the one or more sponges 102. The one or more dividers 832 may be oriented horizontal, vertical, or at an angle relative to a plane of the container 800 and based on the dimensions of the container 800 and the one or more cosmetic sponges 102 to be placed in the container 800.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A container comprising:
a base portion configured to receive a cosmetic sponge;
a cap portion configured to be detachably attached to the base portion; and
one or more apertures disposed in the cap portion, wherein the one or more apertures provide airflow into the container;
one or more apertures disposed in the base portion, wherein the one or more apertures provide airflow into the container; and
wherein the base portion comprises a curved end;
wherein the cap portion comprises a curved end; and
wherein the curved end of the cap portion is configured to receive makeup for absorption by the cosmetic sponge.

2. The container of claim 1, wherein the cosmetic sponge is a dampened cosmetic sponge, and wherein the dampened cosmetic sponge is greater in size than a dry cosmetic sponge.

3. The container of claim 1, wherein the cap portion is detachably attached to the base portion via a friction fit.

4. The container of claim 1, wherein the base portion is made from a transparent material.

5. The container of claim 1, wherein the curved end of the base portion is configured to align the cosmetic sponge upright in the container by supporting a curvature of the cosmetic sponge via a curvature of the curved end of the base portion.

6. The container of claim 5, wherein the aligned cosmetic sponge does not contact inside walls of the base portion in the upright alignment.

7. The container of claim 1, wherein the curved end of the base portion prevents deformation of the cosmetic sponge.

8. The container of claim 1, wherein at least one of the one or more apertures disposed in the base portion is disposed in the curved end.

9. The container of claim 1, wherein at least one of the one or more apertures disposed in the base portion is disposed in a middle portion of the base portion.

10. A container comprising:
a base portion configured to receive a cosmetic sponge;
a cap portion configured to be detachably attached to the base portion;
one or more apertures disposed in the cap portion, wherein the one or more apertures provide airflow into the container; and
a second cap portion configured to be detachably attached to the base portion, wherein the cap portion is detachably attached to the base portion at a first opening of the base portion, wherein the second cap portion is detachably attached to the base portion at a second opening of the base portion, and wherein the second cap portion is disposed distal from the cap portion.

11. A container comprising:
a base portion configured to receive a cosmetic sponge;
a cap portion configured to be detachably attached to the base portion;
one or more apertures disposed in the cap portion, wherein the one or more apertures provide airflow into the container; and
wherein the base portion is configured to receive a cleansing solution to immerse the cosmetic sponge in the cleansing solution within the base portion in a first position, wherein the base portion is proximate a surface in the first position.

12. The container of claim 11, wherein the cleansing solution drains from the base portion via the one or more apertures disposed in the cap portion in a second position, wherein the cap portion is proximate the surface in the second position.

13. A container comprising:
a base portion;
a cap portion wherein the cap portion comprises a curved end; and
an upper lip portion of the cap portion, wherein the upper lip portion extends out from the cap portion so as to provide a separation from the curved end of the cap portion, wherein the base portion is in contact with a surface in a first position, and wherein the upper lip portion is in contact with the surface in a second position.

14. The container of claim 13, wherein the upper lip portion is configured to receive excess makeup from the cosmetic sponge by dragging a portion of the cosmetic sponge containing the excess makeup across the upper lip portion such that the excess makeup collects between the upper lip portion and the curved end of the cap portion.

15. The container of claim 13, further comprising:
a lower lip portion of the cap portion, wherein the lower lip portion extends out from the cap portion and away from the upper lip portion, wherein an outer diameter of the lower lip portion is configured to fit within an inner diameter of a middle portion of the base portion, and wherein the outer diameter of the lower lip portion is substantially the same as the inner diameter of a middle portion of the base portion.

16. The container of claim 15 further comprising:
one or more lower lip protrusions disposed on an outer surface of the lower lip portion, wherein the one or more lower lip protrusions secure the lower lip portion to the middle portion of the base portion by a friction fit.

17. The container of claim 13, wherein the curved end of the cap portion is configured to receive makeup for absorption by the cosmetic sponge.

* * * * *